United States Patent Office 3,462,447
Patented Aug. 19, 1969

3,462,447
CERTAIN AZADIBENZOCYCLOHEPTENE-5-OLS
AND ETHERS DERIVATIVES THEREOF
Cornelis van der Stelt and Petrus S. Hofman, Haarlem, Netherlands, assignors to N.V. Koninklijke Pharmaceutische Fabrieken v/h Brocades-Stheeman & Pharmacia, Amsterdam, Netherlands
No Drawing. Filed Jan. 25, 1967, Ser. No. 611,544
Claims priority, application Great Britain, Jan. 27, 1966, 3,785/66
Int. Cl. C07d *39/06, 39/00*; A61k *27/00*
U.S. Cl. 260—296                    6 Claims

ABSTRACT OF THE DISCLOSURE

The present invention relates to amino alkyl ethers of azadibenzocyclohepten-5-ols. These ethers are prepared from the corresponding 5-ol and 5-halo compounds which are also novel compounds forming a feature of this invention. The ethers of this invention as well as the acid addition and quaternary ammonium salts thereof are therapeutically active compounds possessing antihistaminic properties.

DETAILED DESCRIPTION

This invention relates to new therapeutically useful ethers of azadibenzocyclohepten-5-ols and acid addition and quaternary ammonium salts thereof, to a process for their preparation and to pharmaceutical preparations containing them.

According to the present invention, there are provided the new ethers of azadibenzocyclohepten-5-ols of the general formula

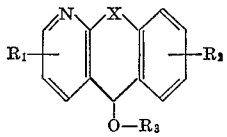

(I)

wherein X represents a —CH$_2$—CH$_2$— or a —CH=CH— group, and R$_1$ and R$_2$ are the same or different and each represents a hydrogen or halogen (preferably chlorine or bromine) atom or a lower alkyl group, for example, methyl, isopropyl, tert.-butyl and neopentyl, and R$_3$ represents a basic nitrogen-containing radical of less than 16 carbon atoms, and acid addition and quaternary ammonium salts thereof. Examples of suitable radicals represented by the symbol R$_3$ are (a) groups of the formula —A—B, wherein A represents a lower alkylene radical and B represents (lower alkyl)amino or a di(lower alkyl) amino group, for example methylaminoethyl, ethylaminoethyl, dimethylaminopropyl, dimethylaminobutyl, diethylaminoethyl and diisopropylaminoethyl, piperidino, pyrrolidino, morpholino or thiamorpholino, (b) groups of the formula

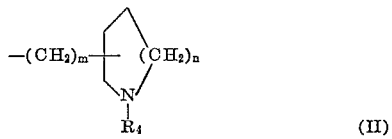

(II)

(wherein R$_4$ represents a hydrogen atom or a lower alkyl group, $m$ represents 0, 1 or 2, and $n$ represents 1 or 2), for example N-methylpiperid-2-yl methyl, N-methylpiperid-4-yl and N-methylpyrrolid-3-yl, and (c) saturated bicyclic heterocyclic radicals such as tropan-3-yl, nortropan-3-yl, 8-(lower alkyl)nortropan-3-yl, for example 8-ethylnortropan-3-yl, 8-ar(lower alkyl)nortropan-3-yl, for example 8-benzylnortropan-3-yl, and quinuclidinyl. The terms "lower alkyl" and "lower alkylene" as employed herein include both straight and branched chain radicals of less than eight carbon atoms.

Preferred compounds are those of Formula I wherein R$_1$ and R$_2$ represent hydrogen atoms and R$_3$ is tropan-3-yl and acid addition and quaternary ammonium salts thereof.

The ethers of the general Formula I and acid addition and quaternary ammonium salts thereof are therapeutically active compounds possessing strong antihistaminic properties. When used for therapeutic purposes they may be employed as such, in the form of quaternary ammonium compounds, or in the form of non-toxic acid addition salts, i.e., salts which are not harmful to the animal organism when used in therapeutic doses, derived from inorganic acids, such as the hydrohalic acids, such as oxalic, fumaric, maleic, citric, tartaric, acetic, succinic, lactic and pamoic acids.

For the above purpose, the compounds of this invention may be administered orally or parenterally in such forms as tablets, capsules, injectables or the like by incorporating the appropriate dosage of the compound with pharmaceutically acceptable carriers according to accepted pharmaceutical practices. The dosage for various mammalian species would be up to 25° mg. daily, administered orally or parenterally, dependant upon the individual requirements of the recipient. The preferred dosage is from 1 to 5 mg. Oral administration of such dosages is preferred.

The ethers of general Formula I may be prepared by methods known for analogous compounds. According to a feature of the invention, they are prepared by the process which comprises reacting a compound of the general formula

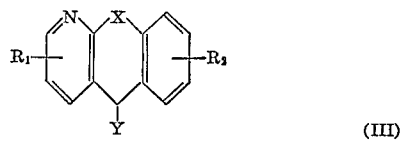

(III)

with a compound of the Formula Z—R$_3$, wherein one of the symbols Y and Z represents a halogen (preferably chlorine) atom and the other represents a group —OM in which M represents an alkali metal atom, or Y represents a halogen atom or a hydroxyl group and Z represents a hydroxyl group, and X, R$_1$, R$_2$ and R$_3$ are as hereinbefore defined. Preferably Y represents a group —OM and Z represents a halogen atom, or Y represents a halogen atom and Z represents a hydroxyl group. When R$_3$ is tropanyl, it is best to react tropine (tropan-3-ol) with a compound of Formula III in which Y represents a halogen atom. The reaction is advantageously carried out by heating the reactants in an inert organic solvent medium, e.g., an aromatic hydrocarbon such as benzene, toluene or xylene. In the case where one of the symbols Y and Z represents a halogen atom and the other represents a hydroxyl group, the reaction may be carried out in the presence of an acid-binding agent, which may constitute an excess of either of the basic reactants.

The starting materials of Formula III can be obtained by reduction by methods known per se, preferably with sodium borohydride, of compounds of the general formula

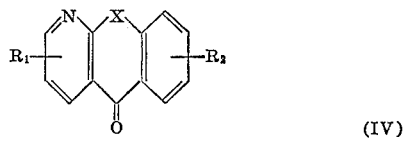

(IV)

(wherein the various symbols are as hereinbefore defined) and, if necessary, converting the hydroxyl group in the resultant 1-azadibenzocyclohepten-5-ols into a group —OM (wherein M represents an alkali metal atom) or a halogen atom by methods known per se.

Ketones of Formula IV wherein X represents

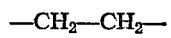

can be obtained by ring closure of unsubstituted or appropriately ring-substituted 2-phenethyl-nicotinic acids under the influence of, for example, polyphosphoric acid.

Ketones of Formula IV wherein X represents

can be obtained from the corresponding ketones in which X is —$CH_2CH_2$— by bromination, for example with bromosuccinimide, and splitting off hydrogen bromide from the resultant 10- or 11-monobromo substituted ketone, for example my means of pyridine. The 2-phenethylnicotinic acid starting materials are prepared by (a) heating in the presence of acetic anhydride a lower alkyl (preferably ethyl) ester of 2-methyl-nicotinic acid, optionally substituted on a ring carbon atom by a halogen atom or lower alkyl group, with benzaldehyde optionally carrying a halogen or lower alkyl substituent, (b) treating the reaction mixture with hydrogen chloride to yield the hydrochloride of the 2-($\beta$-hydroxy-$\beta$-phenyl)ethylnicotinic lactone formed, (c) treating the lactone with phosphorus, iodine and anhydrous acetic acid, and (d) catalytically reducing, for example with hydrogen and Raney nickel, the resultant 2-styryl-nicotinic acid to the corresponding 2-phenethylnicotinic acid.

The carbinols obtained by reduction of the ketones of Formula IV (Y is hydroxyl in Formula III) and halides derived therefrom (Y is halogen) are new compounds and as such form a feature of the invention.

Acid addition and quaternary ammonium salts of the ethers of Formula I may be prepared by methods known per se. For example, the base may be treated with the equivalent quantity of the acid in an inert solvent, for example diethyl ether, thereby obtaining the corresponding acid addition salt, or the base may be treated with the equivalent amount of an appropriate alkyl-halogenide or di(alkyl)sulphate in a solvent with high dielectric properties, for example acetonitrile, to obtain the corresponding quaternary ammonium compound.

By the term "methods known per se" as used in this specification is meant methods heretofore used or described in the literature.

The following examples (1 to 4) in which the temperatures mentioned are in degrees centigrade and the yields stated are related to the theoretical yield, illustrate the preparation of ethers of the present invention. The last example (5) describes the preparation of a suitable dosage form.

EXAMPLE 1

(a) Preparation of 10,11-dihydro-5-hydroxy-5H-benzo[4.5]cyclohepta[1,2-b]pyridine To a solution of 8.5 g. of 10,11-dihydro-5H-benzo[4,5]cyclohepta[1,2-b]pyrid-5-one in 50 ml. of methanol is added at 25–30° 3 g. of sodium borohydride and 150 ml. of methanol. The mixture is heated for 1 hour at 60° and then boiled under reflux for another hour. The alcoholic solution is poured into water and washed with water until a pH 7 is reached. After drying the 10,11-dihydro-5-hydroxy-5H-benzo[4,5]cycloheptal[1,2 - b]pyridine is crystallized from ethanol. Yield 95%; melting point 165–166°.

Analysis.—Calc'd for $C_{14}H_{13}NO$: C, 79.59%; H, 6.20%; N, 6.63%. Found: C, 79.2%; H, 6.2%; N, 6.8%.

(b) Preparation of 2 - (10,11-dihydro-5H-benzo[4,5]cyclohepta-[1,2-b]pyrid-5-yloxy) - N,N - dimethylethylamine maleate 0.04 mol of 10,11-dihydro-5-hydroxy-5H-benzo[4,5]cyclohepta[1,2-b]pyridine is dissolved in 60 ml. of toluene. To the solution is added 0.04 at. of sodium dissolved in 15 ml. of methanol. The methanol is removed by distillation and, after cooling to a temperature of 30°, 0.05 mol of dimethylaminoethyl chloride is added. The reaction mixture is boiled under reflux for a period of 18 hours. After cooling, the mixture is washed thoroughly with water and then concentrated by evaporation of the solvent. The residue is dissolved in warm petroleum ether (boiling range 40°–60°) whereupon the remaining free carbinol crystallizes. After filtration, the solution is concentrated again by evaporation of the solvent. The remaining oil is dissolved in diethyl ether and acidified with maleic acid. There is obtained 9 g. of 2-(10,11-dihydro-5H-benzo[4,5]cyclohepta[1,2-b]pyrid - 5 - yloxy) - N,N-dimethylethylamine maleate. After crystallization from a mixture of ethanol and acetone the melting point is 155–157°; yield 55%.

Analysis.—Calc'd for $C_{22}H_{26}N_2O_5$: C, 66.32%; H, 6.58%; N, 7.03%. Found: C, 66.1%; H, 6.7%; N, 7.0%.

EXAMPLE 2

(a) Preparation of 5-hydroxy-5H-benzo[4,5]cyclohepta[1,2-b]pyridine

Following the procedure of Example 1(a) but substituting an equivalent amount of 5H-benzo[4,5]cyclohepta[1,2-b]pyrid-5-one for the 10,11-dihydro-5H-benzo[4,5]cyclohepta[1,2 - b]pyrid-5-one, 5-hydroxy-5H-benzo[4,5]cyclohepta[1,2-b]pyridine, M.P. 206–208°, is obtained in 95% yield.

Analysis.—Calc'd for $C_{14}H_{11}NO$: C, 80.36%; H, 5.30%; N, 6.69%. Found: C, 80.5%; H, 5.5%; N, 6.5%.

(b) Preparation of 3$\alpha$-(5H-benzo[4,5]cyclohepta[1,2-b]pyrid-5-yloxy)tropane maleate 5 g. (0.024 mol) of 5-hydroxy-5H-benzo[4,5]cyclohepta-[1,2-b]pyridine is boiled under reflux for a period of 5 hours with 30 ml. of thionyl chloride. Excess thionyl chloride is removed by distillation and, after addition of benzene and repeated distillation, the last traces are removed. The hydrochloride of the 5H-benzo[4,5]cyclohpeta[1,2-b]pyrid-5-yl chloride thus formed is boiled under reflux for 16 hours with 10.2 g. (0.072 mol) of tropine and 20 ml. of toluene. Tropine hydrochloride is removed by filtration and the reamining solution is washed six times with water. The organic layer is dried and concentrated by evaporation of the solvent. The residue is dissolved in diethyl ether and maleic acid is added. The 3$\alpha$-(5H-benzo[4,5]cyclohepta[1,2-b]pyrid - 5 - yloxy) tropane maleate thus formed is crystallized from a mixture of acetone and diethyl ether. Yield 51%; melting point 196–198°.

Analysis.—Calc'd for $C_{26}H_{28}N_2O_5$: C, 69.63%; H, 6.29%; N, 6.25%. Found: C, 69.8%; H, 6.0%; N, 6.1%.

EXAMPLE 3

Preparation of 2-(5H-benzo[4,5]cyclohepta[1,2-b]pyrid-5-yloxy)-N,N-dimethylethylamine maleate Following the procedure described in Example 1(b) but substituting an equivalent amount of 5-hydroxy-5H-benzo[4,5]cyclohepta[1,2-b]pyridine (the preparation of which is described in Example 2(a)) for the 10,11-dihydro-5-hydroxy-5H-benzo[4,5]cyclohepta[1,2-b]pyridine, 2-(5H-benzo[4,5]cyclohepta[1,2-b]pyrid-5-yloxy)-N,N - dimethylethylamine maleate is prepared. Yield 52%; melting point 141–142°.

Analysis.—Calc'd for $C_{22}H_{24}N_2O_5$: C, 66.65%; H, 6.10%; N, 7.07%. Found: C, 66.4%; H, 6.2%; N, 7.0%.

EXAMPLE 4

Preparation of 3$\alpha$-(10,11-dihydro - 5H - benzo[4,5]cyclohepta[1,2-b]pyrid-5-yloxy)tropane maleate Following the procedure described in Example 2(b) but substituting an equivalent amount of 10,11-dihydro-5-hydroxy-5H-benzo[4,5]cyclohepta[1,2-b]pyridine (the preparation of which is described in Example 1(a)) for the 5-hydroxy-5H-benzo[4,5]cyclohepta[1,2 - b]pyiridine, 3α-(10,11-dihydro-5H-benzo[4,5]cyclohepta[1,2-b]pyrid - 5-yloxy)tropane maleate is prepared. Yield 36%; melting point 169–171°.

*Analysis.*—Calc'd for $C_{26}H_{30}N_2O_5$: C, 69.31%; H, 6.71%; N, 6.22%. Found: C, 69.2%; H, 6.6%; N, 6.1%.

Moreover, by following the procedures described in the foregoing examples but commencing with appropriate compounds of Formula III—unsubstituted or substituted in either or both of the benzene and pyridine rings—and compounds of the formula Z—$R_3$, other ethers of azadibenzocyclohepten-5-ols conforming to Formula I may be prepared.

EXAMPLE 5

Preparation of 5-chloro-10,11-dihydro-5H-benzo[4,5]-cycloheptal[1,2-b]pyridine (a) Gaseous hydrogen chloride is passed through a suspension of 25 g. of 10,11-dihydro-5-hydroxy-5H-benzo[4,5]cyclohepta[1,2-b]pyridine (prepared following the procedure of Example 1(a)) in 250 ml. of dichloromethane until saturation.

Some ml. of thionyl chloride are added to remove the water formed. The clear solution is concentrated by evaporation of the solvent and the residue is dissolved again in a small amount of dichloromethane. To the solution is added at a temperature of 0° 12.1 g. of triethylamine and after that about 300 ml. of diethyl ether are added.

The precipitated solid is removed by filtration and crystallized from petrol ether (boiling range 60–80°). Yield 85%, melting point 91–92°.

*Analysis.*—Calc'd for $C_{14}H_{12}NCl$: C, 73.20%; H, 5.27%; N, 6.10%. Found: C, 73.5%; H, 5.4%; N, 5.8%.

(b) Preparation of 10,11-dihydro-5-[(1-methylpiperid-2-yl)methoxy]-5H-benzo[4,5]cyclohepta[1,2-b]pyridine A solution of 11.5 g. (0.05 mol) of 5-chloro-10,11-dihydro-5H-benzo[4,5]cyclohepta[1,2-b]pyridine in toluene is added at a temperature of 50° to a solution of 12.9 g. (0.1 mol) of 1-methyl-2-piperidinemethanol in toluene. The mixture is boiled under reflux for 6 hours, whereupon the hydrochloride of the amino-alcohol precipitates. The solid is removed by filtration and washed with diluted alkalihydroxide solution. The hydrochloride is dissolved in diluted acetic acid and in the solution in water the aminoalcohol is set free again, extracted with diethyl ether and dried on sodium sulphate.

After filtration the solvent is removed by evaporation and the amino alcohol distilled under reduced pressure. There is obtained 9.5 g. (60%) of oil consisting of 10,11-dihydro-5-[(1-methylpiperid-2-yl)methoxy] - 5H - benzo [4,5]cyclohepta[1,2-b]pyridine, boiling at 185° (1 mm. Hg).

The free base dissolved in diethyl ether can be converted with acids such as hydrochloric acid, maleic acid, oxalic acid, etc. in salts, which are solid or semi-solid products that upon crystallization form oils.

EXAMPLE 6

(a) Preparation of 5-chloro - 5H - benzo[4,5]cyclohepta-[1,2-b]pyridine

Following the procedure of Example 5(a) but substituting an equivalent amount of 5-hydroxy-5H-benzo[4,5]cyclohepta[1,2-b]pyridine for the 10,11-dihydro-5-hydroxy-5H-benzo[4,5]cyclohepta[1,2-b]pyridine, 5 - chloro - 5H-benzo[4,5]cyclohepta[1,2-b]pyridine is obtained.

(b) Preparation of 5-[(1-methylpiperid-2-yl)methoxy]-5H-benzo[4,5]cyclohepta[1,2-b]pyridine Following the procedure of Example 5(b) but substituting an equivalent amount of 5-chloro-5H-benzo[4,5]cyclohepta[1,2-b]pyridine for the 5-chloro-10,11-dihydro-5-H-benzo[4,5]cyclohepta[1,2-b]pyridine, 5-[(1 - methylpiperid-2-yl)methoxy]-5H - benzo[4,5]cyclohepta[1,2 - b] pyridine is obtained.

EXAMPLE 7

Preparation of 3α-[(10,11-dihydro-5H-benzo[4,5]cyclohepta[1,2-b]pyrid-5-yl)oxy]-8-methyl tropanium iodide 14 g. of 3α-(10,11)-dihydro-5H-benzo[4,5]cyclohepta[1,2-b]pyrid-5-yloxy)tropane, prepared from the maleate obtained according to the procedure of Example 4, is dissolved in 50 ml. of diethyl ether. To the solution is added 0.5 g. of methyliodide and the mixture is left standing at room temperature for 36 hours. The crystalline solid is crystallized from a mixture of acetone and diethyl ether.

There is obtained 3α[(10,11 - dihydro - 5H - benzo[4,5] cyclohepta[1,2-b]pyrid-5-yl)oxy] - 8 - methyl tropanium iodide in 80% yield. Melting point, 225–227°. The NMR spectrum confirms that under these circumstances, quaternization place exclusively at the nitrogen atom of the tropanyl rest.

EXAMPLE 8

Formulation containing 3α-(5H-benzo[4,5]cyclohepta[1,2b]pyrid-5-yloxy)tropane maleate

| | | |
|---|---|---|
| 3α - (5H - benzo[4,5]cyclohepta[1,2 - b]pyrid - 5-yloxy)tropane maleate | g | 5.0 |
| *Saccharum lactis* | g | 72.47 |
| Indigo carminum | mg | 2.0 |
| Amaranth red | mg | 3.0 |
| Tartrazine | mg | 2.5 |
| Natrii phosphas $Na_2HPO_4.2$ aq. | mg | 875.0 |
| Kalii biphosphas puriss.$KH_2PO_4$ | mg | 150.0 |
| *Amylum solani* | g | 20.5 |
| *Magnesii stearas* | g | 1.0 |

A granulate is prepared with the *Saccharum lactis*, the *Amylum solani*, the phosphates and the coloring substances. After drying, 94 g. of the granulate is mixed with 5 g. of the active substance and 1 g. of magnesium stearate. The mixture is compressed into tablets in the usual way whereby 100 mg. tablets, each containing 5 mg. of the active substance, are obtained.

The invention includes within its scope pharmaceutical preparations containing, as the active ingredient, at least one of the therapeutically active compounds of general Formula I, or non-toxic acid addition salt thereof, in association with a pharmaceutically acceptable carrier. The preparations may take any of the forms customarily employed for administration of therapeutically active substances, but the preferred types are those suitable for oral administration and especially tablets, including sustained release tablets, pills and capsules including the substance. The tablets and pills may be formulated in the usual manner with one or more pharmaceutically acceptable diluents or excipients, for example lactose or starch, and include materials of a lubricating nature, for example calcium or magnesium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in water or an organic solvent.

What is claimed is:
1. A compound selected from the group consisting of a compound of the formula

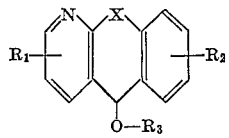

and non-toxic acid-addition and lower alkyl quaternary ammonium salts thereof, wherein X is selected from the group consisting of —$CH_2$—$CH_2$— and —CH=CH—; $R_1$ and $R_2$ are each selected from the group consisting of hydrogen, halogen and lower alkyl and $R_3$ is selected from the group consisting of a radical of the formula —AB wherein A is lower alkylene and B is selected from the group consisting of lower alkyl amino, and di(lower alkyl)amino.

2. A compound according to claim 1 wherein $R_3$ represents a di(lower alkyl)amino(lower alkyl) group.

3. A compound according to claim 1 selected from the group consisting of a compound having the name 2-(10,11 - dihydro - 5H - benzo[4,5]cyclohepta[1,2-b]pyrid-5-yloxy)-N,N-dimethylethylamine and its non-toxic acid addition and lower alkyl quaternary ammonium salts.

4. A compound according to claim 2 selected from the group consisting of a compound having the name 2-(5H - benzo[4,5]cyclohepta[1,2-b]pyrid - 5 - yloxy)-N,N-dimethylethylamine and its non-toxic acid addition and lower alkyl quaternary ammonium salts.

5. A compound of the formula

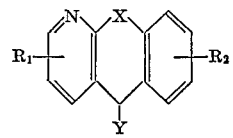

wherein X is selected from the group consisting of —$CH_2$—$CH_2$— and —CH=CH—; $R_1$ and $R_2$ are each selected from the group consisting of hydrogen, halogen and lower alkyl, with a proviso that one of said terms $R_1$ or $R_2$ is other than hydrogen and Y is selected from the group consisting of hydroxy and halo.

6. A compound in accordance with claim 1 wherein $R_3$ represents the radical —AB and B is selected from the group consisting of lower alkyl amino and di(lower alkyl)amino.

References Cited

Burger: Medicinal Chemistry, 2nd edition, Interscience, p. 497, (1960).

HENRY R. JILES, Primary Examiner

A. L. ROTMAN, Assistant Examiner

U.S. Cl. X.R.

260—243, 247.1, 247.5, 290, 292, 294.7, 295, 295.5, 297, 326.5; 424—248, 263, 266, 267, 276

PO-1050
(5/69)

UNITED STATES PATENT OFFICE
CERTIFICATE OF CORRECTION

Patent No. 3,462,447          Dated August 19, 1969

Inventor(s) Cornelis van der Stelt and Petrus S. Hofman

It is certified that error appears in the above-identified patent and that said Letters Patent are hereby corrected as shown below:

In column 1, line 3, "ETHERS" should read - - ETHER - -. Column 2, line 23, "25° mg." should read - - 25 mg. - -. Column 3, line 57, "[4.5]" should read - - [4,5] - -; and on line 69, "H, 6.2%" should read - - H, 6.3% - -. Column 5, line 3, "pyiridine," should read - - pyridine, - -; and on line 19, "cycloheptal" should read - - cyclohepta - -. Column 6, line 21, before "place" insert - - takes - -; and on line 28, "[1,2b]" should read - - [1,2-b] - -. Column 7, Claim 4, line 1, "2" should read - - 1 - -.

SIGNED AND
SEALED
MAY 26 1970

(SEAL)
Attest:

Edward M. Fletcher, Jr.
Attesting Officer

WILLIAM E. SCHUYLER, JR.
Commissioner of Patents